UNITED STATES PATENT OFFICE.

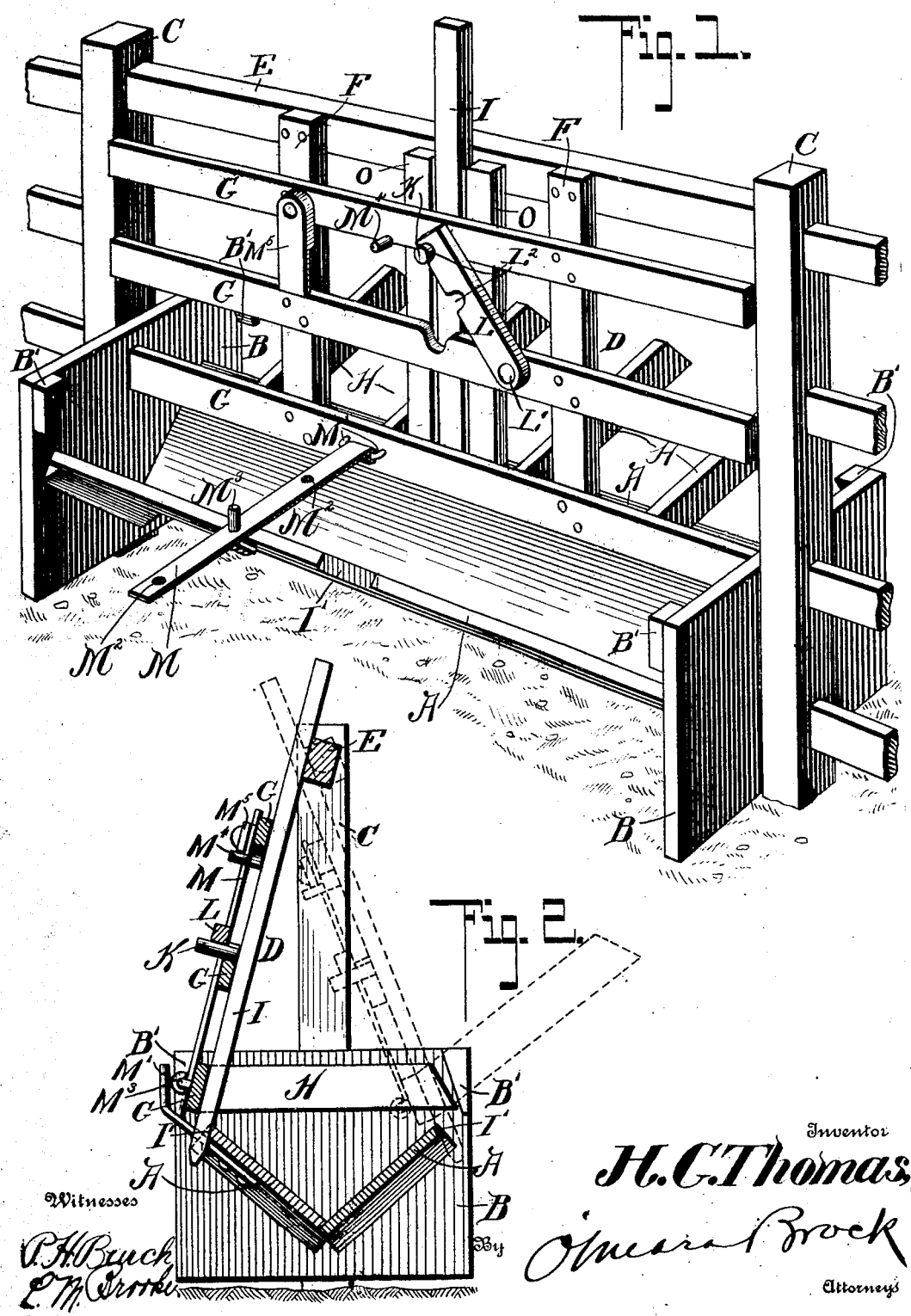

HENRY G. THOMAS, OF BUTLER, MISSOURI.

TROUGH.

No. 916,222.

Specification of Letters Patent.

Patented March 23, 1909.

Application filed February 21, 1908. Serial No. 417,127.

*To all whom it may concern:*

Be it known that I, HENRY G. THOMAS, a citizen of the United States, residing at Butler, in the county of Bates and State of Missouri, have invented a new and useful Improvement in Troughs, of which the following is a specification.

This invention is an improved construction of feed trough particularly adapted for feeding hogs and cattle, and is preferably arranged in a fence between two fence-posts and occupies the same space as the ordinary fence panel.

The object of the invention is to provide a simple and durable construction of feed trough which can be adjusted so as to accommodate large and small sized animals, and another object is to provide a trough of such construction and capable of such manipulation that the animals can be excluded therefrom while the said trough is being filled.

With these objects in view, my invention consists essentially in providing a swinging panel which is arranged above the trough and provided with means for locking it in various positions, said swinging panel also carrying a series of partitions so arranged as to extend across the trough and sub-divide it and thereby prevent crowding.

The invention consists also in certain details of construction, hereinafter fully described and pointed out in the claim.

In the drawing forming a part of this application: Figure 1 is a perspective view of a trough constructed in accordance with my invention, the swinging panel being adjusted in its central or intermediate position. Fig. 2 is a vertical sectional view, the swinging panel being shown in full lines in the position it occupies when the trough is ready for feeding, and in dotted lines in the position it occupies when the animals are excluded from the trough.

In carrying out my invention I employ a trough A which is arranged between the end-boards B which are arranged between the fence posts C. A swinging panel D is arranged between these fence posts C and is adapted to swing back and forth over the trough A in the manner and for the purpose hereinafter fully described. The panel D comprises the top beam E which has its ends journaled in the fence post C, and the vertical strips F connected to the top beam E, and carrying the horizontal strips G which complete the swinging panel, as shown.

A plurality of partition-strips H are connected to the bottom horizontal strips G and extend outwardly therefrom so that when the swinging panel is thrown back to the position shown in full lines in Fig. 2, these partition-strips H will extend horizontally across the trough and sub-divide it into a number of different feeding compartments, thereby preventing the animals crowding each other. In Fig. 1 I have shown the panel adjusted to its central or intermediate position which is the adjustment employed whenever it is intended to feed little pigs as it prevents their getting into the trough. The dotted lines of Fig. 2 indicate the positions the parts assume when the panel is swung over so as to exclude the animals from the trough, in order that the said trough may be filled with food.

For the purpose of locking the swinging panel in its various adjustments I employ a vertically movable bolt I which works freely up and down between a pair of guide strips O and its lower end is adapted to engage the notches I' cut in the opposite sides of the trough, and this bolt I is provided with a pin K which not only limits its movements but is also engaged by a latch L pivoted at L' and having notches $L^2$ in which the pin K fits. By means of this latch the bolt is locked in either its upper or lowered position and it is then impossible for the hogs to push the said bolt upwardly. A bar M is hinged to the bottom strip of the panel at M' and is provided with a series of apertures $M^2$ which are adapted for engagement with the upwardly projecting hook $M^3$ attached to one side of the trough. By means of this bar M the panel can be quickly and easily swung back or forth as desired, and when not in use it may be turned up upon the guide pin $M^4$ and held in place by means of a turn-button $M^5$.

B' indicate blocks fastened to the end boards B to limit the movements of the swinging panel.

In operation the panel is swung to the position indicated in dotted lines while the trough is being filled, and it is then moved back to the position shown in full lines when full size animals are to be fed and adjusted to the intermediate position shown in Fig. 1, when little pigs are to be fed.

Having thus fully described my invention, what I claim as new and desire to secure by Letters Patent is:—

The combination with a trough having a hook at one side, of a swinging panel arranged above the trough and carrying partition strips, a vertically movable bolt having a pin, a pivoted latch having a plurality of notches for engagement with the pin, an apertured bar pivoted to the bottom of the panel, and a turn-button carried by the panel, and adapted for engagement with the pivoted bar, substantially as shown and described.

HENRY G. THOMAS.

Witnesses:
B. F. JETER,
J. L. SHEPHERD.